United States Patent
Smith et al.

(10) Patent No.: US 12,524,191 B2
(45) Date of Patent: Jan. 13, 2026

(54) REMOTE CONTENT MANAGEMENT SYSTEM AND METHOD OF USE

(71) Applicant: Zapprio, LLC, Sarasota, FL (US)

(72) Inventors: Richard Smith, Sarasota, FL (US); William Jattin, Sarasota, FL (US); Stephen Banks, Sarasota, FL (US)

(73) Assignee: Zapprio, LLC, Sarasota, FL (US)

( * ) Notice: Subject to any disclaimer, the term of this patent is extended or adjusted under 35 U.S.C. 154(b) by 0 days.

(21) Appl. No.: 18/801,685

(22) Filed: Aug. 12, 2024

(65) Prior Publication Data

US 2025/0053369 A1 Feb. 13, 2025

Related U.S. Application Data

(60) Provisional application No. 63/531,822, filed on Aug. 10, 2023.

(51) Int. Cl.
*G06F 3/147* (2006.01)
*G06K 19/06* (2006.01)

(52) U.S. Cl.
CPC ....... *G06F 3/147* (2013.01); *G06K 19/06037* (2013.01)

(58) Field of Classification Search
CPC .......... H04N 21/41265; H04N 21/482; H04N 21/41415; H04N 21/42204; H04N 21/485; H04N 21/8173; H04N 21/8186; G06F 9/452

See application file for complete search history.

(56) References Cited

U.S. PATENT DOCUMENTS

| | | | |
|---|---|---|---|
| 7,327,267 B2 | 2/2008 | Tsunoda | |
| 8,234,572 B2 | 7/2012 | Rathi et al. | |
| 8,526,876 B1 * | 9/2013 | Johnson | H04W 4/18 455/456.1 |
| 8,683,516 B2 | 3/2014 | Benyamin | |
| 8,825,668 B2 | 9/2014 | Yadav et al. | |
| 9,490,998 B1 | 11/2016 | Danciu et al. | |
| 9,516,382 B2 | 12/2016 | Paugh et al. | |
| 9,582,504 B2 | 2/2017 | Hwang et al. | |
| 10,057,622 B1 | 8/2018 | Danciu et al. | |
| 10,469,894 B1 | 11/2019 | Danciu et al. | |
| 11,150,614 B2 | 10/2021 | Lavie et al. | |
| 11,290,769 B2 | 3/2022 | Danciu et al. | |

(Continued)

*Primary Examiner* — Koosha Sharifi-Tafreshi
(74) *Attorney, Agent, or Firm* — McDonald Hopkins LLC

(57) ABSTRACT

A method of using a digital sign assembly by an end-user is disclosed. The method includes providing a digital sign assembly, the digital sign assembly having an internet connectable digital media player (DMP) and a screen, wherein the DMP cooperates with the screen to display a digital sign, wherein the digital sign assembly is controllable by a remote controller on an end-user's mobile device. The method also includes, displaying a QR code on the screen of the digital sign assembly, the QR code being scannable by the mobile device of the end-user; displaying a remote controller end-user interface on the mobile device of the end-user, when the end-user scans the QR code on the digital sign assembly; receiving a content selection from the end-user via remote controller end-user interface via the Internet; and displaying the content selection using the digital sign assembly as a digital sign.

20 Claims, 14 Drawing Sheets

(56) References Cited

U.S. PATENT DOCUMENTS

| | | |
|---|---|---|
| 11,582,338 B2 | 2/2023 | Grajales |
| 2006/0218187 A1* | 9/2006 | Plastina .............. G06F 16/4387 |
| 2009/0055760 A1* | 2/2009 | Whatcott ........... H04N 21/4131 |
| | | 715/764 |
| 2010/0057778 A1* | 3/2010 | Fein .................... H04L 12/2812 |
| | | 707/E17.009 |
| 2013/0035787 A1 | 2/2013 | Canter |
| 2014/0165104 A1* | 6/2014 | Choi ................. H04N 21/4383 |
| | | 725/40 |
| 2018/0218395 A1* | 8/2018 | Strobl ................. H04N 21/812 |
| 2019/0339925 A1* | 11/2019 | Lorenz .............. G06Q 30/0272 |
| 2022/0095006 A1* | 3/2022 | Seed ................. H04N 21/4788 |
| 2022/0224965 A1 | 7/2022 | Danciu et al. |
| 2022/0392628 A1 | 12/2022 | Grajales |

\* cited by examiner

REMOTE CONTENT MANAGEMENT SYSTEM AND METHOD OF USE

CROSS-REFERENCE TO RELATED APPLICATION

This application claims the priority benefit of U.S. Prov. Pat. App. No. 63/531,822, filed Aug. 10, 2023, and titled, "REMOTE MANAGEMENT OF CONTENT", which is herein incorporated by reference in its entirety.

FIELD OF THE INVENTION

The present disclosure relates generally to remote management of content, and more particularly to remotely managing content for digital signs.

BACKGROUND

Digital marketing can be traced back to the '90s. The purpose of marketing, generally, is to attract consumers and propel the growth of an organization through market analysis and research. Therefore, there is a need to increase the ease of digital marketing.

SUMMARY

The following presents a summary of this disclosure to provide a basic understanding of some aspects. This summary is intended to neither identify key or critical elements nor define any limitations of embodiments or claims. This summary may provide a simplified overview of some aspects that may be described in greater detail in other portions of this disclosure. Furthermore, any of the describe aspects may be isolated or combined with other described aspects without limitation.

In one aspect of the invention, a method of using a digital sign assembly by an end-user, comprising: providing a digital sign assembly, the digital sign assembly having an internet connectable digital media player (DMP) and a screen, wherein the DMP cooperates with the screen to display a digital sign, wherein the digital sign assembly is controllable by a remote controller on an end-user's mobile device. The method further comprises, displaying a QR code on the screen of the digital sign assembly, the QR code being scannable by the mobile device of the end-user. The method further comprises, displaying a remote controller end-user interface on the mobile device of the end-user, when the end-user scans the QR code on the digital sign assembly. The method further comprises, receiving a content selection from the end-user via remote controller end-user interface via the Internet. The method further comprises, displaying the content selection using the digital sign assembly as a digital sign.

In another aspect of the invention, the mobile device of the end-user is Internet connected; wherein the remote controller end-user interface is displayed on a browser of the mobile device. In another aspect of the invention, the digital sign assembly is wirelessly connectable to the Internet; wherein the QR code is generated by a content management software, wherein the content selection is content uploaded by the end-user. In another aspect of the invention, the content is organized in a playlist; wherein the content on the playlist is one or more of, static images, videos, texts, slide show, time schedule, fitness studio information, coach profiles, class schedules, station assignments, workout routine, maintenance information, member onboarding, custom graphics uploads, timed corporate announcements, advertisement, hospital information, doctor directory, end-user doctor's appointment information, hospital facility map, realtor contact information, real estate office information, real estate listings, augmented reality, structured data, application programming interface, websites, e-commerce, apparel items, sports scores, and/or sporting event information. In another aspect of the invention, the content on the playlist is organized by media type; wherein the content on the playlist is filtered by user and/or end-user, such that not all content is viewable by all users and end-users. In another aspect of the invention, the content on the playlist is customized to the end-user; wherein the content on the playlist is filtered by the location of the digital sign assembly. In another aspect of the invention, the location is one or more of city, state, region, building, position in room, and/or proximity to specific piece of exercise equipment.

In another aspect of the invention, when the QR code is scanned by the end-user, the QR code may be temporarily removed from the digital sign assembly for a predetermined amount of time, thereby permitting only one mobile device to interact with the digital sign assembly at a time.

In yet another aspect, a method of using a digital sign assembly by a user, comprising, providing a digital sign assembly, the digital sign assembly having an internet connectable digital media player (DMP) and a screen, wherein the DMP cooperates with the screen to display a digital sign, wherein the digital sign assembly is controllable by a remote controller on an end-user's mobile device. The method further comprises, displaying a QR code on the screen of the digital sign assembly, the QR code being scannable by the remote device of the user. The method further comprises, displaying a remote controller user interface on the remote device of the user, when the user scans the QR code on the digital sign assembly. The method further comprises, receiving content, playlist, and/or remote controller user interface changes from the user.

In another aspect of the invention, the remote device of the user is Internet connected; wherein the remote controller user interface is displayed on a browser of the remote device.

In another aspect of the invention, the digital sign assembly is wirelessly connectable to the Internet. In another aspect of the invention, the QR code is generated by a content management software, wherein the content is uploaded by the user, the playlists are created by the user, and the remote controller user interface is created by the user.

In another aspect of the invention, the content is organized in the playlist. In another aspect of the invention, the content on the playlist is one or more of, static images, videos, texts, slide show, time schedule, fitness studio information, coach profiles, class schedules, station assignments, workout routine, maintenance information, member onboarding, custom graphics uploads, timed corporate announcements, advertisement, hospital information, doctor directory, end-user doctor's appointment information, hospital facility map, realtor contact information, real estate office information, real estate listings, augmented reality, structured data, application programming interface, websites, e-commerce, apparel items, sports scores, and/or sporting event information. In another aspect of the invention, the content on the playlist is organized by media type. In another aspect of the invention, the content on the playlist is filtered by user and/or end-user, such that not all content is viewable by all users and end-users. In another aspect of the invention, the content on the playlist is customized to the end-user. In another aspect of the invention, the content on the playlist is filtered by the location of the digital sign assembly, wherein the location is one or more of city, state, region, building, position in room, and/or proximity to specific piece of exercise equipment.

In another aspect of the invention, when the QR code is scanned by the user, the QR code is temporarily removed from the digital sign assembly for a predetermined amount of time, thereby permitting only one mobile device to interact with the digital sign assembly at a time.

In yet another aspect, a digital sign assembly, comprises, an internet connectable digital media player (DMP) and a screen, wherein the DMP cooperates with the screen to display a digital sign, wherein the digital sign assembly is controllable by a remote controller on an end-user's mobile device. The digital sign assembly further comprising memory and a processor, the memory storing executable code when executed by the processor performs actions comprising, displaying a QR code on the screen of the digital sign assembly, the QR code being scannable by the mobile device of the end-user. The processor further performs actions comprising, displaying a remote controller end-user interface on the mobile device of the end-user, when the end-user scans the QR code on the digital sign assembly. The processor further performs actions comprising, receiving a content selection from the end-user via remote controller end-user interface via the Internet. The processor further performs actions comprising, displaying the content selection using the digital sign assembly as a digital sign.

In another aspect of the invention, the mobile device of the end-user is Internet connected; wherein the remote controller end-user interface is displayed on a browser of the mobile device.

In another aspect of the invention, the digital sign assembly is wirelessly connectable to the Internet; wherein the QR code is generated by a content management software, wherein the content selection is content uploaded by the end-user.

In another aspect of the invention, the content is organized in a playlist; wherein the content on the playlist is one or more of, static images, videos, texts, slide show, time schedule, fitness studio information, coach profiles, class schedules, station assignments, workout routine, maintenance information, member onboarding, custom graphics uploads, timed corporate announcements, advertisement, hospital information, doctor directory, end-user doctor's appointment information, hospital facility map, realtor contact information, real estate office information, real estate listings, augmented reality, structured data, application programming interface, websites, e-commerce, apparel items, sports scores, and/or sporting event information. In another aspect of the invention, the content on the playlist is organized by media type; wherein the content on the playlist is filtered by user and/or end-user, such that not all content is viewable by all users and end-users. In another aspect of the invention, the content on the playlist is customized to the end-user; wherein the content on the playlist is filtered by the location of the digital sign assembly, wherein the location is one or more of city, state, region, building, position in room, and/or proximity to specific piece of exercise equipment.

In another aspect of the invention, the QR code is scanned by the end-user, the QR code may be temporarily removed from the digital sign assembly for a predetermined amount of time, thereby permitting only one mobile device to interact with the digital sign assembly at a time.

In yet another aspect, a digital sign assembly, comprises, an internet connectable digital media player (DMP) and a screen, wherein the DMP cooperates with the screen to display a digital sign, wherein the digital sign assembly is controllable by a remote controller on a user's remote device. The digital sign assembly further comprising memory and a processor, the memory storing executable code when executed by the processor performs actions comprising, displaying a QR code on the screen of the digital sign assembly, the QR code being scannable by the remote device of the user. The processor further performs actions comprising, displaying a remote controller user interface on the remote device of the user, when the user scans the QR code on the digital sign assembly. The processor further performs actions comprising, receiving content, playlist, and/or remote controller user interface changes from the user.

In another aspect of the invention, the remote device of the user is Internet connected; wherein the remote controller user interface is displayed on a browser of the remote device.

In another aspect of the invention, the digital sign assembly is wirelessly connectable to the Internet. In another aspect of the invention, the QR code is generated by a content management software. In another aspect of the invention, the content is uploaded by the user. In another aspect of the invention, the playlists are created by the user, and the remote controller user interface is created by the user.

In another aspect of the invention, the content is organized in the playlist. In another aspect of the invention, the content on the playlist is one or more of, static images, videos, texts, slide show, time schedule, fitness studio information, coach profiles, class schedules, station assignments, workout routine, maintenance information, member onboarding, custom graphics uploads, timed corporate announcements, advertisement, hospital information, doctor directory, end-user doctor's appointment information, hospital facility map, realtor contact information, real estate office information, real estate listings, augmented reality, structured data, application programming interface, websites, e-commerce, apparel items, sports scores, and/or sporting event information. In another aspect of the invention, the content on the playlist is organized by media type. In another aspect of the invention, the content on the playlist is filtered by user and/or end-user, such that not all content is viewable by all users and end-users; wherein the content on the playlist is customized to the end-user. In another aspect of the invention, the content on the playlist is filtered by the location of the digital sign assembly, wherein the location is one or more of city, state, region, building, position in room, and/or proximity to specific piece of exercise equipment.

In another aspect of the invention, when the QR code is scanned by the user, the QR code is temporarily removed from the digital sign assembly for a predetermined amount of time, thereby permitting only one mobile device to interact with the digital sign assembly at a time.

Provided is a platform to store, organize, and update media content. Provided is a retail virtual fitting room showing augmented reality of a person wearing selected apparel. Provided is a digital signage for retrieving and viewing sports data.

BRIEF DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

DETAILED DESCRIPTION

Figure 1A:
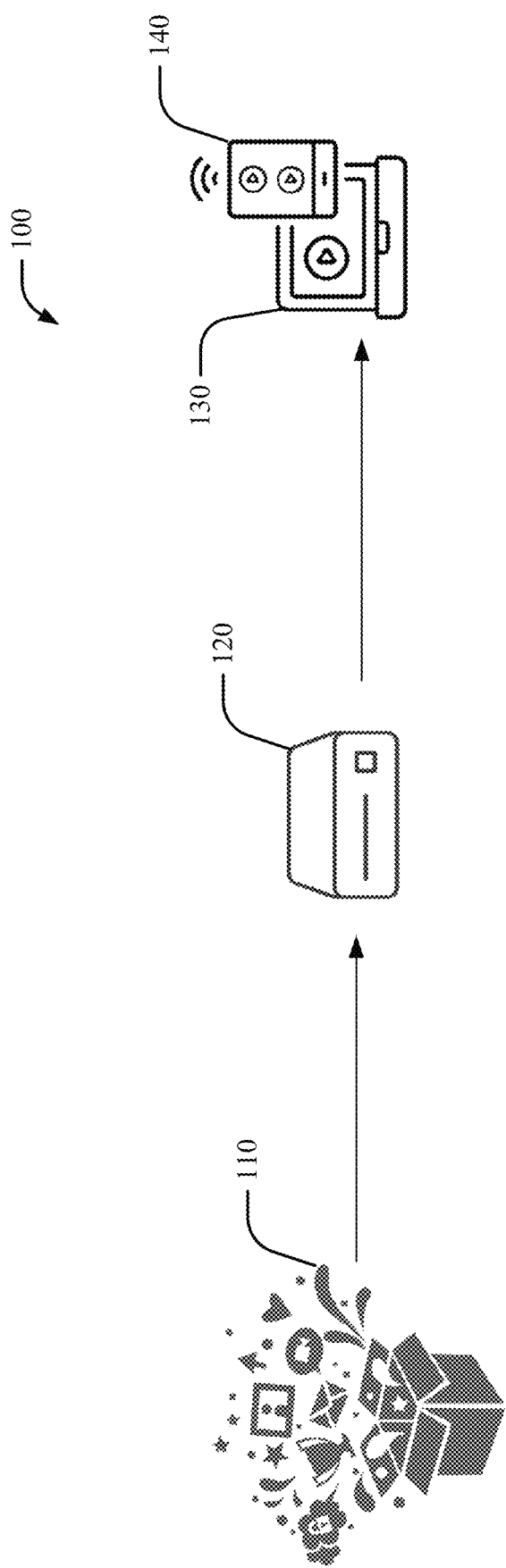
FIGS. 1A-B illustrate a diagram that represents an example, non-limiting way a user can easily manage digital content using the content management system disclosed herein in accordance with the present disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or nonvolatile memory. Nonvolatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can also include a disk. The memory can store an operating system that controls or allocates resources of a computing device. The memory can also store data for use by the processor.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system and/or program that controls or allocates resources of a computing device.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product that can be executed on a computing system.

The embodiments also relate to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each electrically connected to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

Digital advertising is a form of marketing used to promote brands, products, or services through digital communication. Digital advertising aim to engage and persuade its audience. One of the ways to achieve this is to create tailored ads based on the platform and ad format, the audience, and market research. Digital advertising accounts for a large portion of the total advertising expenditure worldwide and is already valued in the hundreds of billions of dollar. As advertising play such a significant role in the economy, there is an incentive and a need to increase the ease of content management of digital signs.

Provided is a content management system (CMS) that facilitates remote management (e.g., control) of content for digital signs, as well as digital signs and digital sign assemblies that utilize the CMS. The digital sign assembly may be any Internet connected Internet Protocol television (IPTV) device. The CMS facilitates custom content upload and interaction, as well as remote management of the content on the digital signs and digital sign assemblies. This remote interaction is intended for front-end management of the digital signs. The CMS supports a variety of media types such as videos, static images, texts, augmented reality (AR), Hypertext Markup Language (HTML), structured data content, application programming interface (API) feeds, websites, or the like. The support for various media types and orientations allow users (e.g., users of the CMS, studio owners, vendors, etc.) to create diverse and interesting playlists for the digital signs. For example, the digital signs may be configured to display different media types oriented horizontally (e.g., landscape) or vertically (e.g., portrait). As used herein, the term "user" will generally mean a user of the CMS, unless noted otherwise either explicitly or by context.

To facilitate the management of media files, the CMS may group media types into content types that may include certain category of information such as lists of products or services including e-commerce products or services, schedules, personnel background information, annual reports, or the like. This grouping allows end-users (e.g., target audience for a digital sign) to easily interact with a digital sign on a display by quickly finding and selecting the type of media they want to play on the display when a remote controller is generated on the web browser of their internet connected mobile device upon scanning a quick-response code (QR code) on the digital sign. As used herein, the term "end-user" will generally mean the target audience a digital sign is intended to engage, unless noted otherwise either explicitly or by context.

Creating playlists using the CMS is typically a straightforward process. A user can select media files from a list of available items in the media library to add to the playlist. Once added to the playlist, the user can assign the media files into content types, reorder items, remove unwanted ones, and/or save the playlist for future use.

The CMS provides advantages that includes quick and easy access, increased efficiency, campaign tracking, versatility, cost-effective, and accessibility. The CMS provides a quick and easy access because the CMS remote controller features QR codes, which are a fast and convenient way to access information or a website without the need for typing long Uniform Resource Locators (URLs) or remembering text strings. The CMS provides increased efficiency because the use of QR codes enables rapid scanning and retrieval of information, making the CMS remote controller a more efficient tool for various processes. The CMS provides campaign tracking because the CMS remote controller can track the success of a marketing campaign through QR code scans, allowing for analysis and measurement of engagement. The CMS provides versatility because the CMS remote controller's QR codes can store a variety of information, making it a versatile tool for different applications. The CMS is cost effective because the QR codes in the CMS remote controller is a low-cost alternative to traditional marketing methods, as it eliminates the need for printing costs and design fees. The CMS provides accessibility because the CMS remote controller's QR codes can be scanned using smartphones and other devices, making it accessible to a wider audience, including those with disabilities. When an end-user scans a QR code using an Internet connected mobile device having a screen and Internet browser, the remote controller will appear in the browser. The end-user can then interact with the available content on the screen using the remote controller.

Figure 1B:
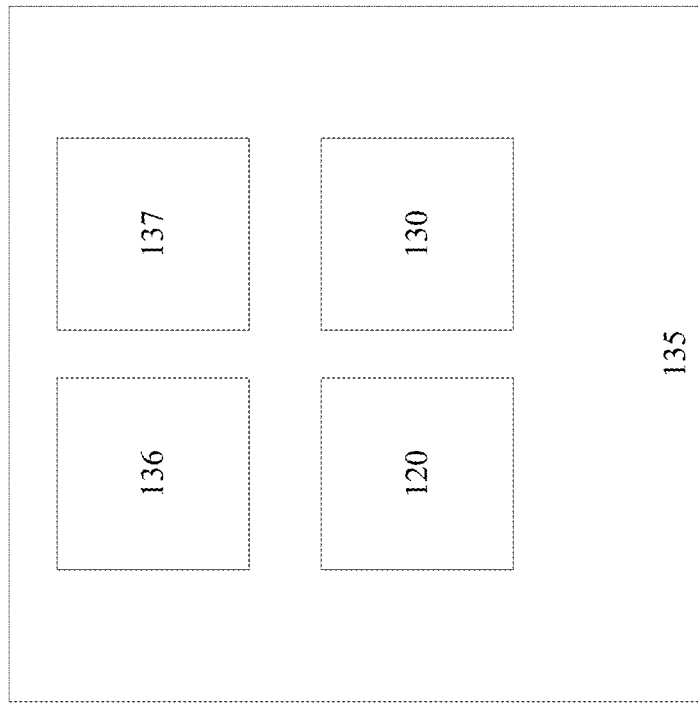

FIG. 1 illustrates a diagram 100 that represents an example, non-limiting way a user can easily manage digital content using the CMS disclosed herein. The CMS allows users to easily manage their digital content 110 by providing a centralized platform to store, organize, and update the content. A user can simply plug a digital media player (DMP) 120 into a power outlet and connect a High-Definition Multimedia Interface (HDMI) cable (or other appropriate hard-wired connection) to a screen 130 to stream a digital sign. The digital sign is a web-based digital sign streamed over the Internet. The digital sign may be displayed on a digital sign assembly 135. The digital sign assembly 135 may be comprised of the digital media player 120 (DMP) and screen 130 connected to and/or implemented using a processor 136 and memory 137. The screen 130 may be any suitable device, or combination of devices, capable of displaying a digital sign. Screen 130 may be, but is not limited to, an IP TV, a screen and projector, a computer monitor, and/or a television. By scanning a QR code in a digital sign displayed on screen 130 of the digital sign assembly 135, using a mobile device 140, a user can remotely access the playlist controls via that mobile device 140, without the need for intervening hardware or authentication solutions. As described herein, the term "digital sign" shown on the screen 130 of the digital sign assembly 135 means a sign that is created by way of a software, in the form of a playlist, which is then published to the DMP 120 of the digital sign assembly 135. Each digital sign assembly 135 may have its own playlist. Further, the playlist on each digital sign assembly 135 may be customized to individual end users, or types of individual end users, interacting with the digital sign assembly 135.

As can be seen, the digital sign assembly 135 and mobile device 130 have two-way interaction with each other over the Internet. The digital sign assembly 135 and mobile device 140 only have to be both connected to the internet in order for the mobile device 140 and digital sign assembly 135 to carry out this two-way interaction, which also permits the end-user of the digital sign assembly 135 to also have two-way interaction with the digital sign assembly 135.

Figure 2:
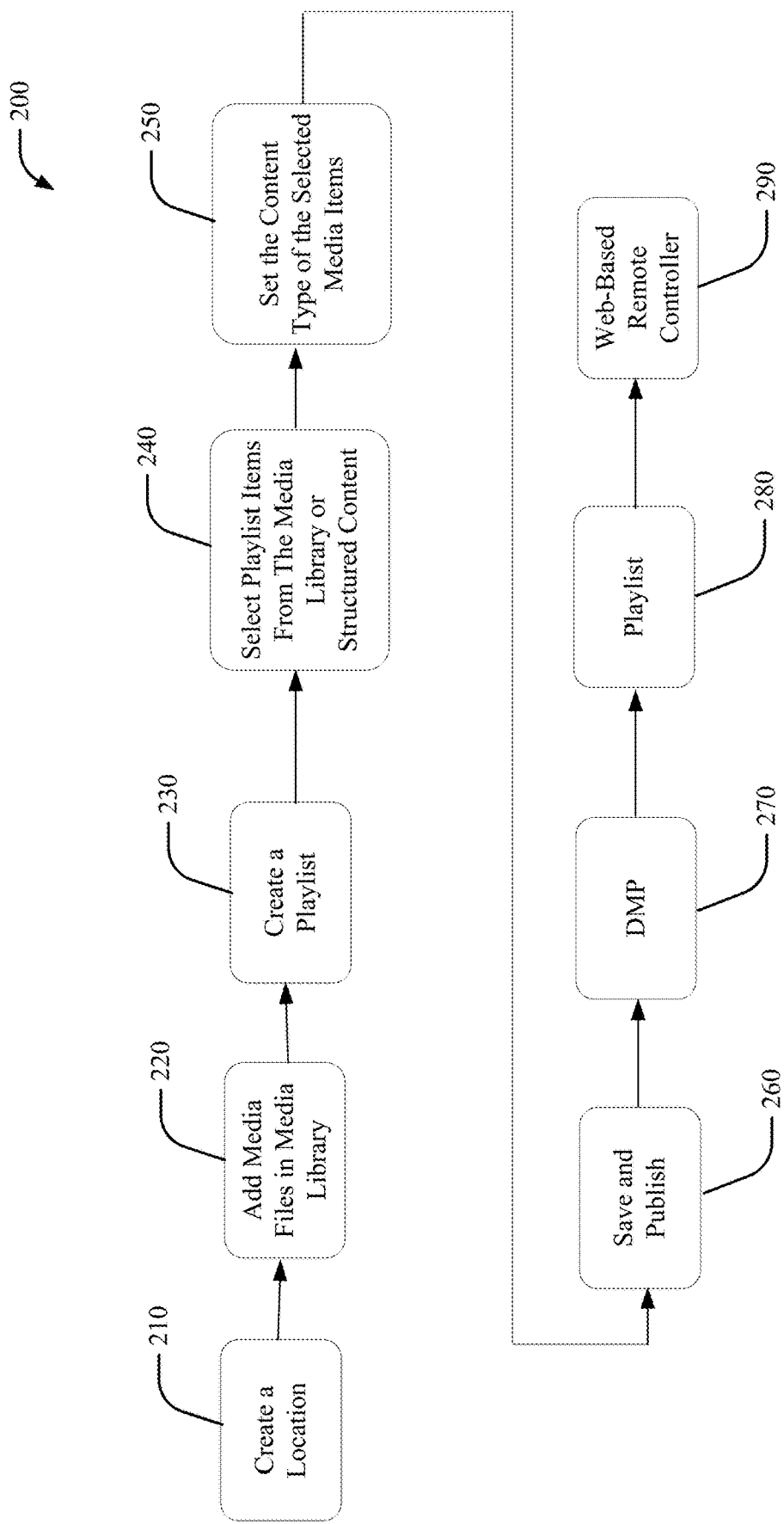
FIG. 2 illustrates a diagram that represents example, non-limiting steps for managing content of a remote-controlled digital signage by a user in accordance with the present disclosure.

FIG. 2 illustrates a diagram 200 that represents example, non-limiting steps for managing content of a remote-controlled digital signage contemplated herein. It is appreciated that there may be additional steps or fewer steps, and the steps may have one or more alternative sequences. At step 210, a user can create (e.g., establish) a location for a display to generate location-specific playlists. Location-specific playlist is a way to give a playlist a unique identifier for a unique location. For example, a fitness studio franchise will have a different content playlist for their displays in one city versus another city. Location-specific playlists allow a user to display different media types or content types in either landscape or horizontal orientations at discrete locations. Further, the content on a location-specific playlist may differ based on building location within the city where a digital sign assembly 135 is located. Additionally, the content on a location-specific playlist may differ based on where the digital sign assembly 135 is located within the building. For example, when the digital sign assembly 135 is located next to a specific workout station or piece of exercise equipment within a exercise studio in a specific city, the playlist may contain workout routine details and schedules specific to that workout station or piece of exercise equipment at that specific studio.

At step 220, media files can be added into a media library by the user or by the administrator of the CMS (e.g., system administrator). The media files can contain any type of digital content in any (e.g., image and video) format, depending on the user's preference and the administrator's guidelines. The media type may be determined when the media file is uploaded into the web application (e.g., CMS). For example, if a user uploads a .mp4 file that is a video file or if a user uploads a .png or .jpg file that is an image, these media types are automatically determined by the CMS. In preferred embodiments, the media library is hosted by a web/application server such as Amazon Web Services (AWS). It is appreciated that the media library can be hosted at one or more local server and/or web server.

At step 230, a user can create playlists and set visibility options for the contents in the playlists. Playlists may be defined by its use or purpose. For example, a fitness studio can have a playlist for the beginning of the year with fitness class schedules, merchandise, events, etc., geared towards members with New Year's resolutions and another playlist for a blowout sale of certain merchandise at the end of summer. The playlists can have settings to limit its visibility based on who is meant to view them (e.g. the specific end-user or type of intended end-user). The user can chose to have the contents visible only to them or visible to other studio owners or visible globally to anyone with a website link, or QR code containing the website link, directed to the playlists or content library. The QR code may appear on a digital sign that the end-user is interacting with. The QR code works as a shortcut to a playlist's remote controller, which is provided as a webpage. By scanning the QR code on a digital sign of the internet connected digital sign assembly 135 using an internet connected mobile device 140, the end-user can have limited access and visibility to the playlists, which may be dictated by the type of end-user and location of digital sign assembly 135.

For example, the playlist content may be filtered based on the exercise class an end-user in participating it. More specifically, when an end-user participating in an exercise class uses a mobile device 140 to scan the QR code of a digital sign assembly 135 located next to the specific workout station or piece of exercise equipment, the playlist shown on the mobile device 140 may permit the end-user to select from individualized content to show on the digital sign assembly 135, such as information related to the coach facilitating the class, the workout routine for that specific station/equipment for the class, and the schedule for the class, such as upcoming classes or the next station/equipment to use in the routine.

Access to the content library may also be provided by the system administrators. Tokens can be used to provide limited or unlimited access. Tokens are generated and provided from the CMS side. Tokens are randomly generated codes attached to the playlist's hyperlink. Tokens are similar to passcodes that are attached to a remote URL. This hyperlink or remote URL can be shared by system administrators outside of the CMS by copying and pasting it on an email, message, etc. System administrators can regenerate the token which makes the old token invalid, and users with the old token will no longer have access to control the playlist.

At step 240, the user can select playlist items from the media library or structured content such as staff profiles, e-commerce products, real estate listings and virtual tours. For example, a fitness studio franchise with multiple locations may have digital signs providing playlist items such as fitness instructor profiles, virtual tours, and e-commerce products such as workout clothes specific to the location of the digital sign assembly 135 within the fitness studio, as well as the geographical location of the individual fitness studio. Depending on the weather condition of a geographical location, a fitness studio may offer for sale different types of workout clothes or products. When files or playlist items are assigned to a playlist the system automatically recognizes what media type the files or playlist items are (e.g., based off the file type such as, for example, image or video).

At step 250, the user can set the content type of the selected media items. The content type can be e-commerce products or services, schedules, personnel background information, annual reports, scheduled announcements, equipment maintenance information, equipment management information, or the like. Keeping with the fitness studio franchise example, the user can designate media items containing coach profiles, class schedules, station assignments, member onboarding, custom graphics uploads, advertisements, and timed corporate announcements. Further, in the fitness studio franchise example, the user can also designate media items containing workout clothes as e-commerce products (e.g., a content type) and these media items can include one or more media types. For example, these e-commerce products can be presented to the end-users as static images, videos, AR, etc., containing the workout clothes. As another example, e-commerce products such as clothes can be presented as an AR with a virtual fitting room. The screen for the digital sign may be operatively connected to a camera to capture images of the end-users so that the end-users may select clothing items to try on virtually. The virtual workout clothes can overlay on the images of the end-users such that an AR is created. In a real estate office example, the content type can include, but not be limited to, real estate listings and realtor contact information. In a hospital example, the content type can include, but not be limited to, a Doctor directory, end-user Doctor's appointment information, and facility map.

At step 260, the user can save their selection, settings, and preferences for the playlist items and publish the playlists by generating playlist Uniform Resource Locator (URL). A playlist URL can be generated for individual playlists. A playlist URL may be set to be valid for a set period of time, after which a new playlist URL may be generated, even though the new playlist URL may link to the same playlist as the expired playlist URL.

At step 270, the digital sign assembly 135 may be setup by connecting the digital sign assembly 135 to power and the Internet. For example, during setup on the digital sign assembly 135, the DMP 120 and screen 130 may each be connected to mains power and may be connected to each other via an HDMI cable. Further, the DMP 120 may be connected to the Internet. At step 280, the user can insert the published playlist URL into their DMP (e.g., DMP 120) to display their playlist on a screen (e.g., screen 130). Alternatively, the QR code for the playlist may automatically be provided to the digital sign assembly 135 by the CMS and appear on the screen 130, once the digital sign assembly 135 is powered on and connected to the Internet. The playlist represents a front-end, public view of CMS generated content. The QR code on the screen 130, which the end-user can scan with their mobile device 140 brings up an HTML remote controller in the web browser of the mobile device 140, which provides the end-user with access to the playlist controls of the content (digital sign) of the screen 130 of the digital sign assembly 135. This feature allows the user to interact with the playlist on their own mobile device, allowing for convenient and remote control of the displayed content.

At step 290, the remote controller displayed in the web browser of an Internet connected mobile device 140 offers an innovative user interface/user experience (UI/UX) design (remote controller UI), connecting with the playlists and allowing end-users to interact with the displayed content by tapping on buttons representing the various viewable content on the playlist. The remote controller UI buttons are grouped by content type and can be attached to a slideshow, a time schedule, or a single content such as a video, image, or HTML generated content. The web-based remote controller screen is HTML based and can be accessed by anyone in the world with an Internet connected mobile device having a web browser and a way of viewing and selecting the buttons of the HTML based remote controller in the web browser. Stated alternatively, the web-based remote controller may be accessed by anyone anywhere with a mobile device. The web-based remote controller appears on the web-browser of the mobile device 140 of an end-user when an end-user scans a QR code on the screen 130 of a digital sign assembly 135. The remote controller permits the end-user to have two-way interaction with the digital sign assembly 135. The remote controller and remote controller UI may also be utilized by a user to upload content for the digital sign assembly, assembly playlists for the digital sign assembly 135 and create remote controllers UIs for the remote controller associated with the digital sign assembly 135.

The mobile device 140 may be any Internet connected device capable of scanning a QR code containing a URL and having a web-browser capable of displaying the HTML content located at the URL and permitting the user to interact with the content located at the URL. With the content at the URL being the remote controller and the playlist items on the remote controller, which the end-user can select and show on the digital sign assembly 135.

Figure 3:
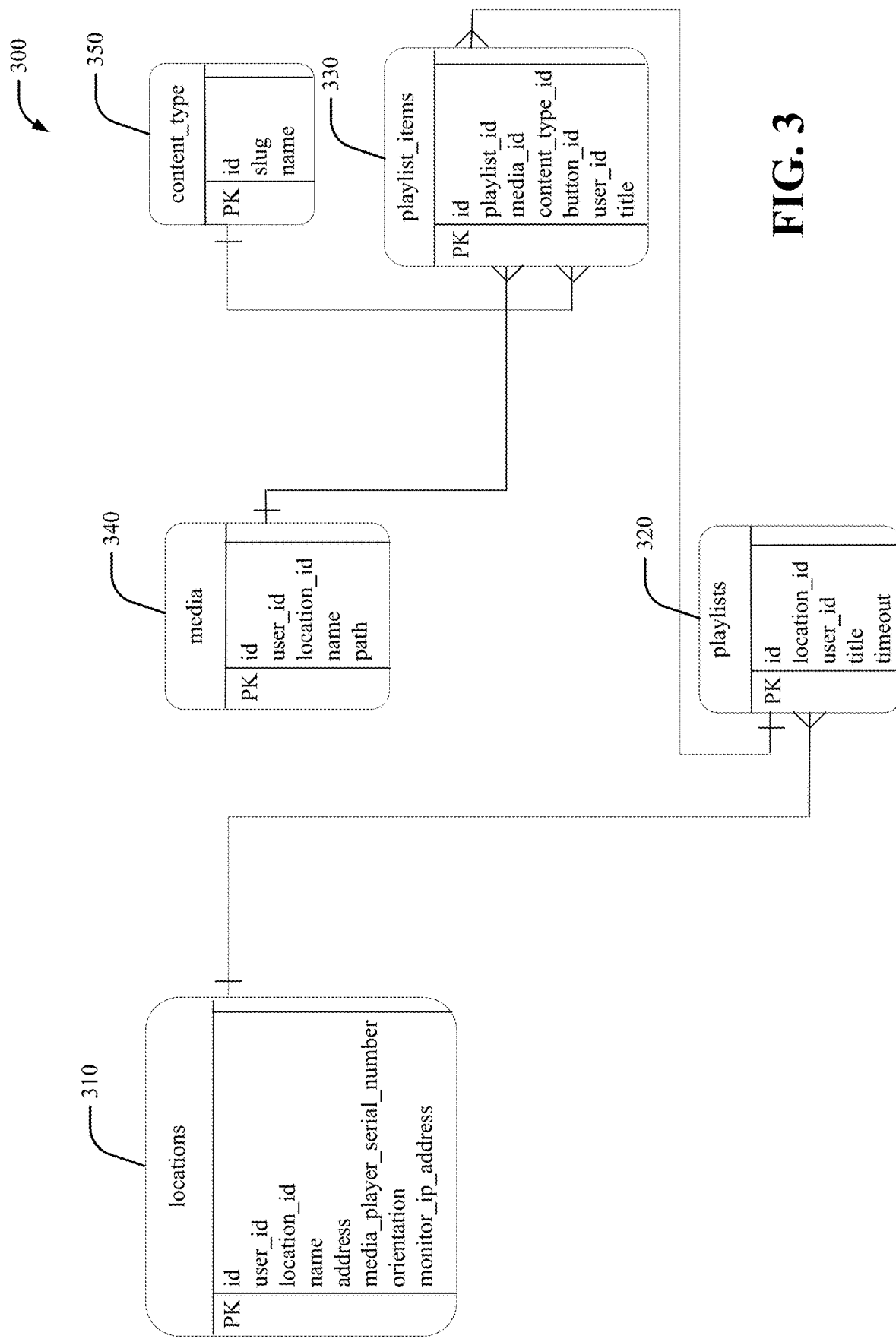
FIG. 3 illustrates an example, non-limiting overview of data structures comprising locations table, playlists table, playlist items table, media table, and content type table in accordance with the present disclosure.

FIG. 3 illustrates an example, non-limiting overview of data structures 300 comprising locations table 310, playlists table 320, playlist items table 330, media table 340, and content type table 350. The data structures 300 show the architecture of the relationship between the locations table 310, playlists table 320, playlist items table 330, media table 340, and content type table 350. For example, the data structures 300 show which location has which playlists, which playlists has which playlist items, and which playlist items contain which media types and content types.

These data structures 300 are created based on requirements of the CMS users. The locations table 310 includes a primary key (PK) for identification (ID) and user ID, location's ID, name, address, media player serial number, orientation, and monitor Internet Protocol (IP) address. The playlists table 320 includes a primary key for ID and location ID, user ID, title, and timeout. The playlist items table 330 includes a primary key for ID and playlist ID, media ID, content type ID, button ID, user ID, and title. The media table 340 includes a primary key for ID, user ID, location ID, name, and path. The content type table 350 includes a primary key for ID, slug, and name.

Figure 4:
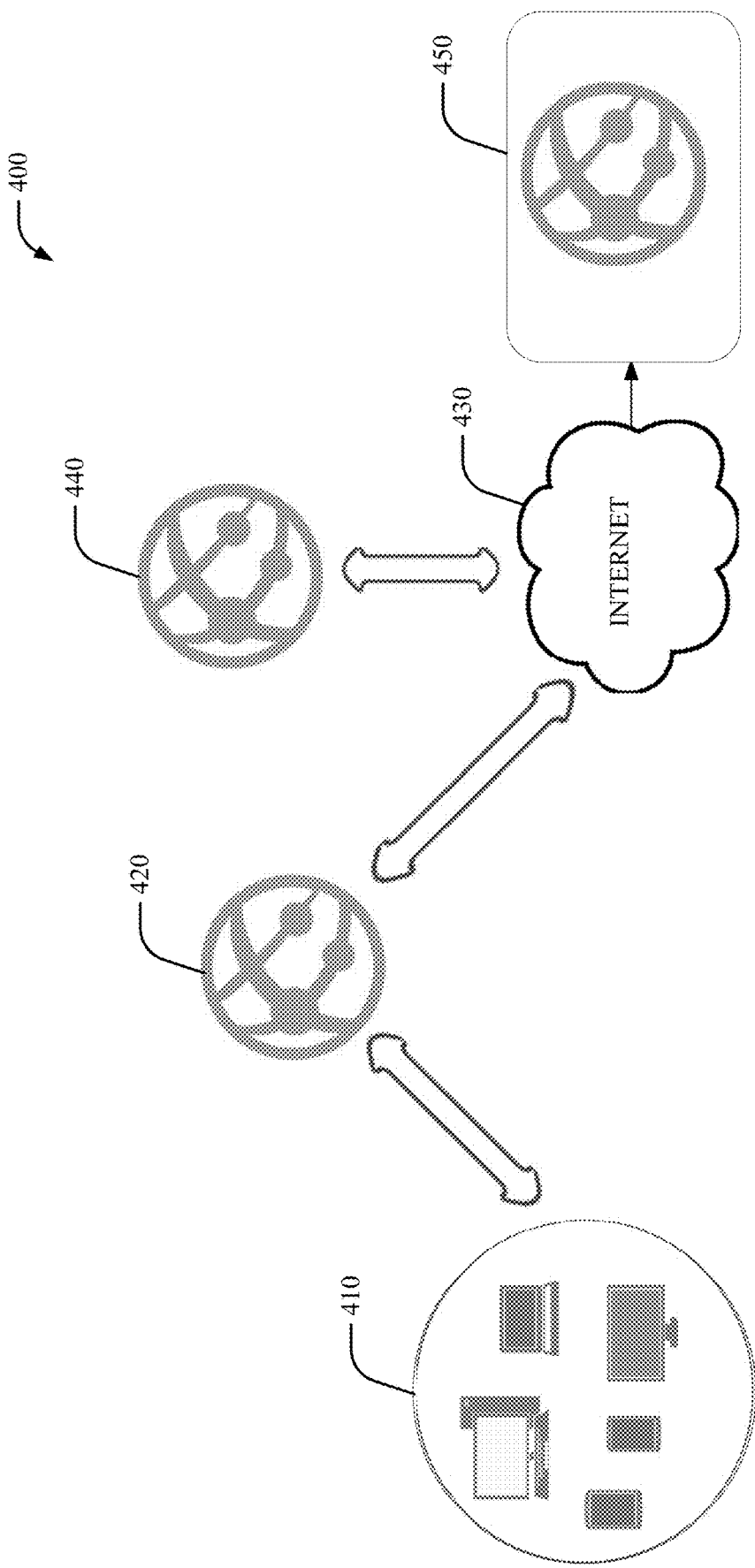
FIG. 4 illustrates an example, non-limiting content management system in accordance with the present disclosure.

FIG. 4 illustrates a content management system 400 comprising user's remote device 410, remote controller 420, Internet 430, content management software 440, and digital sign 450 of the digital sign assembly. The user's remote device 410 may include, by way of non-limiting example, a personal computer (PC), laptop device, tablet, smart phone, or a touch screen. The user's remote device 410 may be used to access remote controller 420, which is a remote website, to interact with and control, over the Internet 430, the content of a playlist incorporated in a digital sign 450. The digital sign 450 may also be a website or other content that is displayed on a screen of the digital sign assembly. The Internet 430 may be a communication framework that includes the world wide web, cloud, or web/application server such as AWS.

Figure 5:
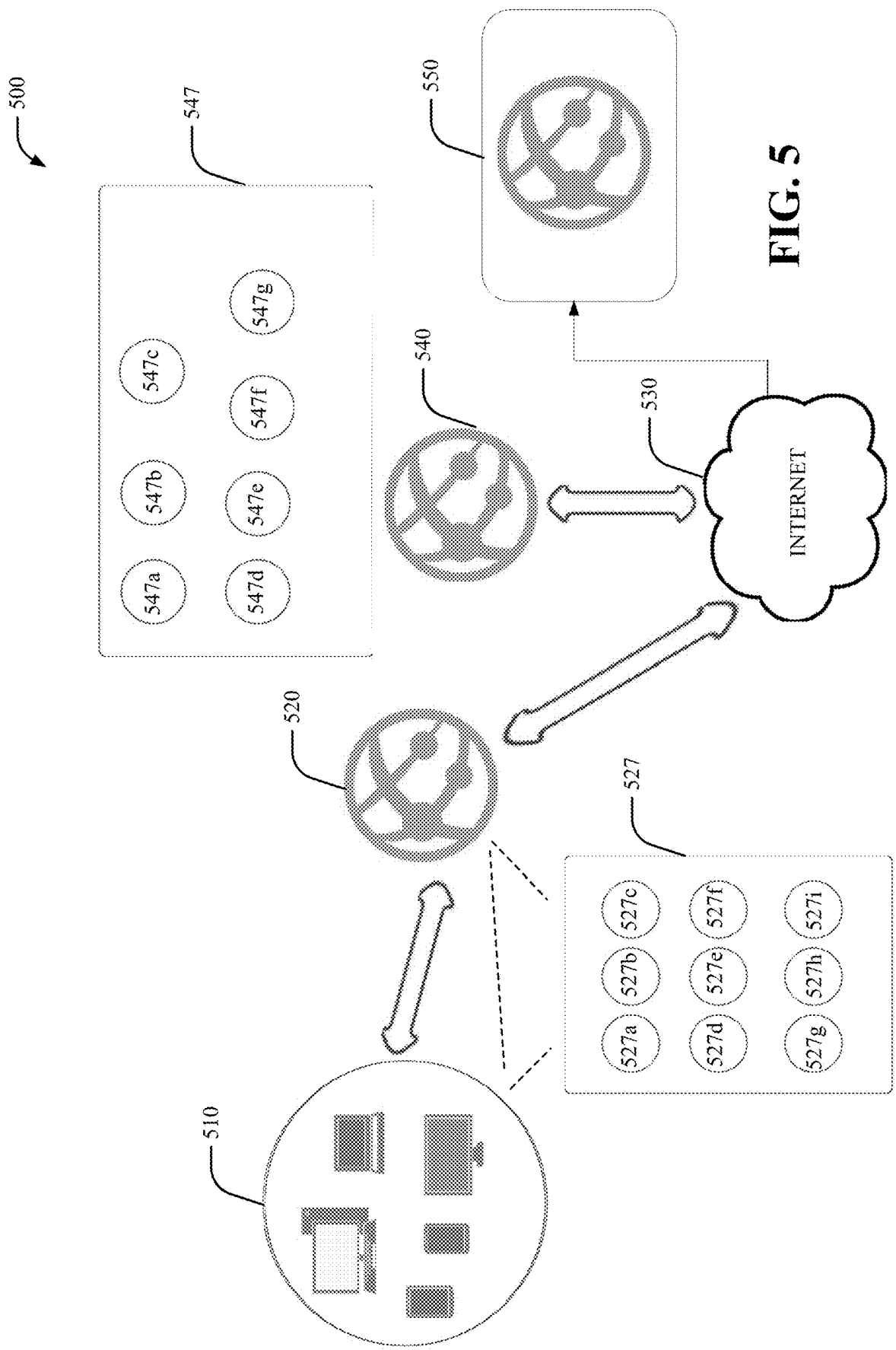
FIG. 5 illustrates another example, non-limiting content management system in accordance with the present disclosure.

For sake of brevity, components with the same name may have the same features, and as such, may not be described again. FIG. 5 illustrates a content management system 500 comprising user's remote device 510, remote controller 520, remote controller UI 527, Internet 530, content management software 540, content types 547, and digital sign 550. The controller 520 may have a user interface such as controller UI 527 with buttons 527a-i for management of the media files, playlists, and digital sign 550 shown on the screen of the digital sign assembly. The buttons 527a-i may be created from icon images that the user uploaded to the media library. The user can create the buttons, name the buttons, rearrange the buttons, and assign the buttons a function or piece of content or contents. The content management software 540 may be programmed to facilitate the management of media items by grouping the media types into content types. However, the user may also use the controller 520 via the controller UI 527 to arrange and organize the media items. For example, the media types 547a-g are in container 547 containing multiple content types. The user may use controller UI 527 to organize the media types 547a-g into respective content types. By way of non-limiting example, the media type 547a may be static images, media type 547b videos, media type 547c augmented reality, media type 547d structured data content, media type 547e application programming interface (API) feeds, media type 547f websites, and media type 547g e-commerce. The user may use the remote controller and remote controller UI to design the remote controller UI that the end-user sees when the end-user is viewing and interacting with the remote controller on the Internet connected mobile device of the end-user. Stated alternatively, the user may use the user remote controller and user remote controller UI on the browser of the user remote design to upload content, design playlists, and design the end-user remote controller UI that the end user sees when the end-user is viewing and interacting with the end-user remote controller on the Internet connected mobile device of the end-user.

Figure 6:
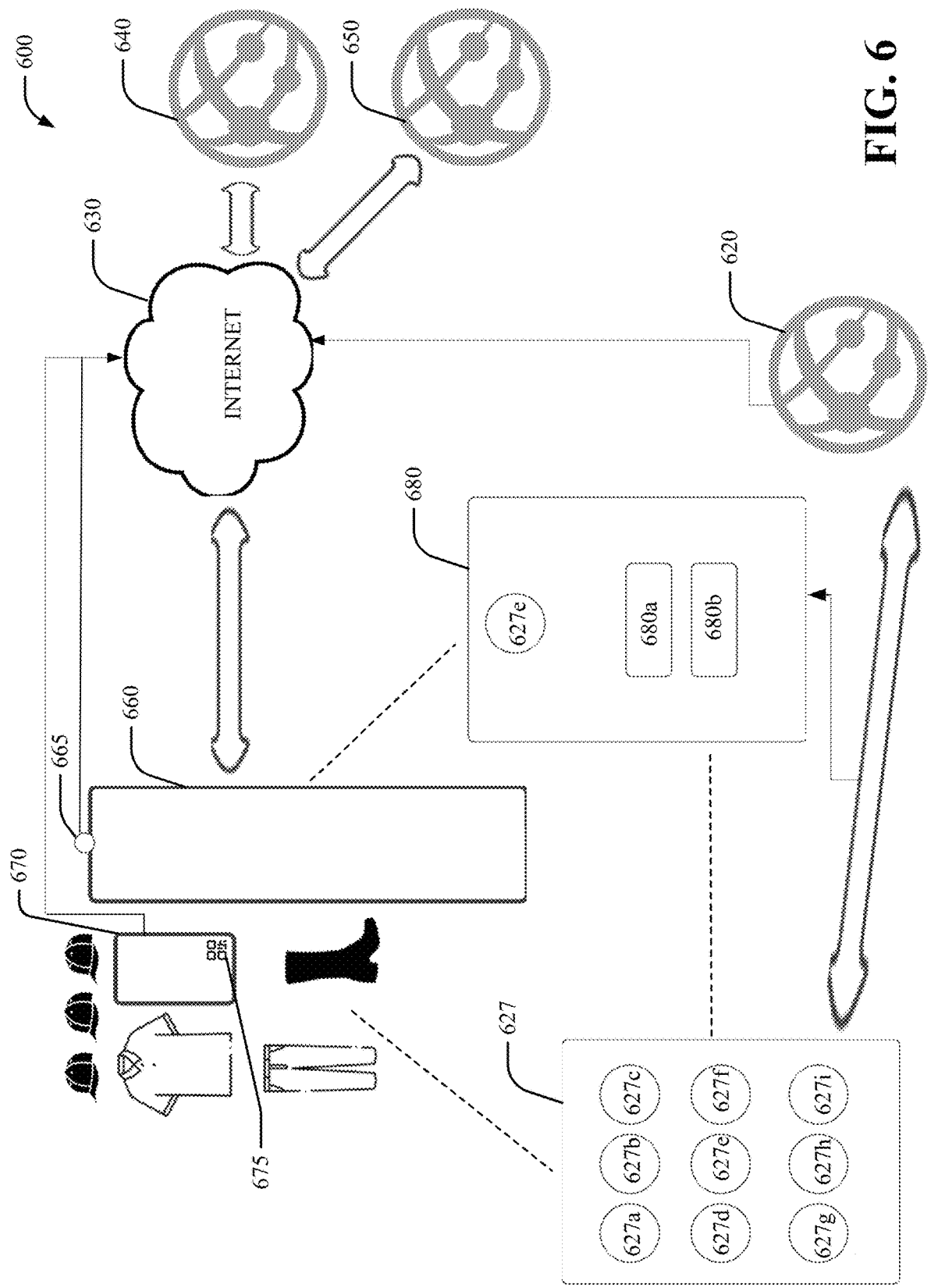
FIG. 6 illustrates an example, non-limiting retail virtual fitting room application in accordance with the present disclosure.

FIG. 6 illustrates a retail virtual fitting room application 600 comprising controller 620, controller UI 627, Internet 630, content management software 640, and e-commerce site 650, apparel/retail display 670, QR code 675, virtual fitting room display 660, camera 665, shopping module 680, add to cart button 680a, and buy now button 680b. The apparel/retail display 670 shown on the screen is a digital sign that is a website with additional apparel items. The apparel/retail display 670 includes a QR code 675. An end-user can scan QR code 675 using a mobile device to receive access to controller 620, which is a remote website, with a controller UI 627 that provides apparel options 627a-i. The end-user may select among the apparel options 627a-627i from the end-user's mobile device used to scan the QR code. In some embodiments, the selected apparel options 627a-i may be presented as three-dimensional (3D) models of the merchandise. Upon selecting the apparel option 627e, a shopping module 680 may appear on the end-user's mobile device to provide the end-user with the option whether to select the add to cart button 680a or select the buy now button 680b. The end-user may select the add to cart button 680a to add the apparel option 627e to a virtual shopping cart or select the buy now button 680b to check out with a commerce connection.

Additionally, upon selecting the apparel options 627a-i, data on the particular apparel item may be displayed in the form of static images, videos, texts, etc. The end-user can select to read about the particular apparel item, view static images, view videos, etc. If the end-user selects to try on an apparel item, the end-user may be asked to provide permission to capture images of the user via the camera 665. An AR image of the end-user wearing one or more selected apparel items may be generated on the virtual fitting room display (digital sign assembly) 660. The e-commerce site 650 provides data for the apparel options 627a-i. Furthermore, the e-commerce site 650 may provide the shopping module 680 showing the selected apparel option 627e and the add to cart button 680a or the buy now button 680b.

Figure 7:
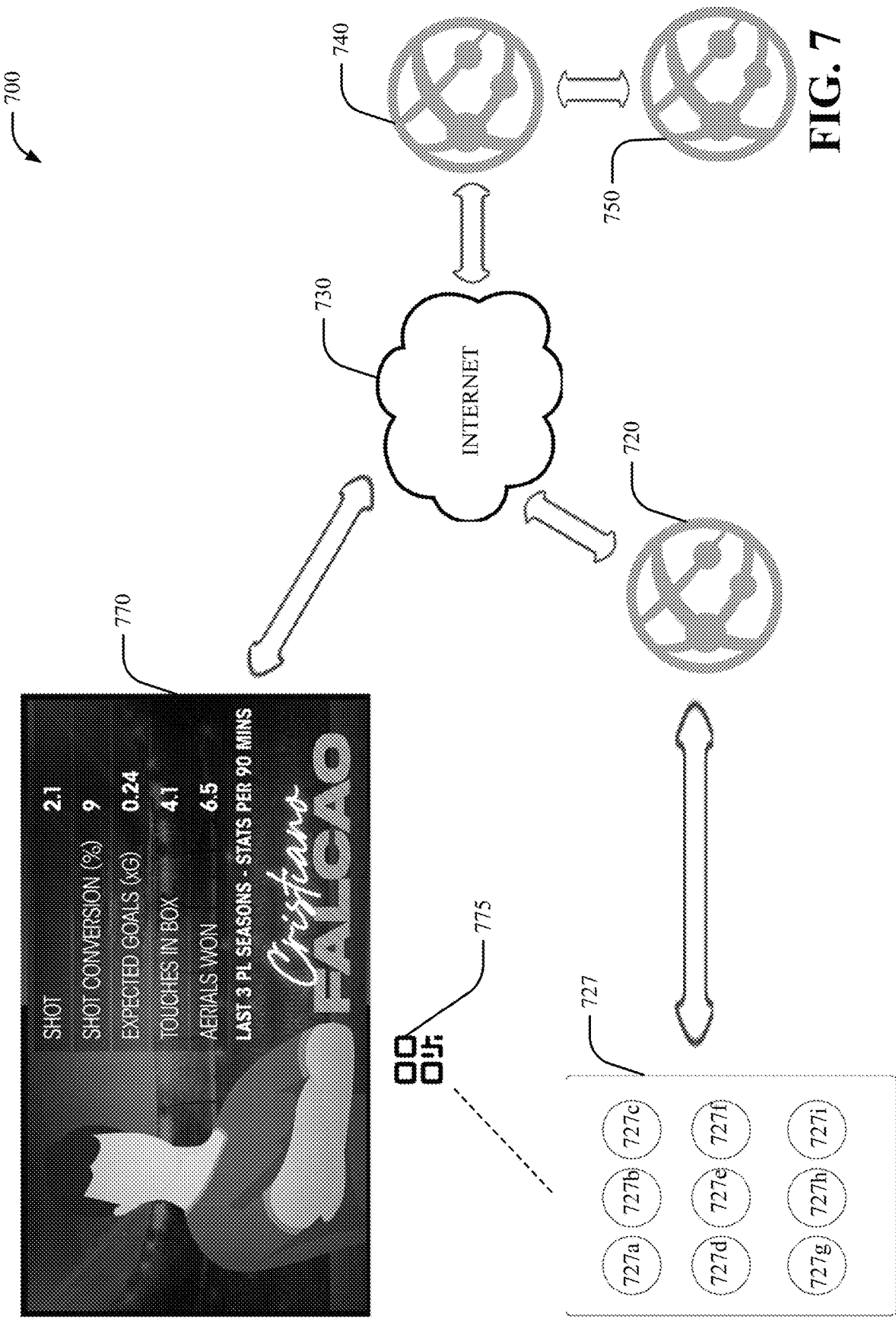
FIG. 7 illustrates an example, non-limiting sports data application in accordance with the present disclosure.

FIG. 7 illustrates a sports data application 700 comprising controller 720, controller UI 727, Internet 730, content management software 740, sports data application programming interface (API) 750, digital sign 770, and QR code 775. The digital sign 770 on the screen of the digital sign assembly is a website displaying sports data. The digital sign 770 includes a QR code 775. An end-user can scan QR code 775 using a mobile device to receive access to controller 720, which is a remote website, with a controller UI 727 that provides data options 727a-i from a playlist. The end-user can select among the data options 727a-i from the end-user's mobile device used to scan the QR code. Upon selecting one of the data options 727a-i on the playlist, the sports data associated with the selected data options 727a-i from the playlist may be displayed on the digital sign 770. The sports data may be provided to the content management software 740 via the sports data API 750. The content management software 740 supports a variety of media types, and by way of non-limiting example, video, images, text, HTML, etc.

Figure 8:
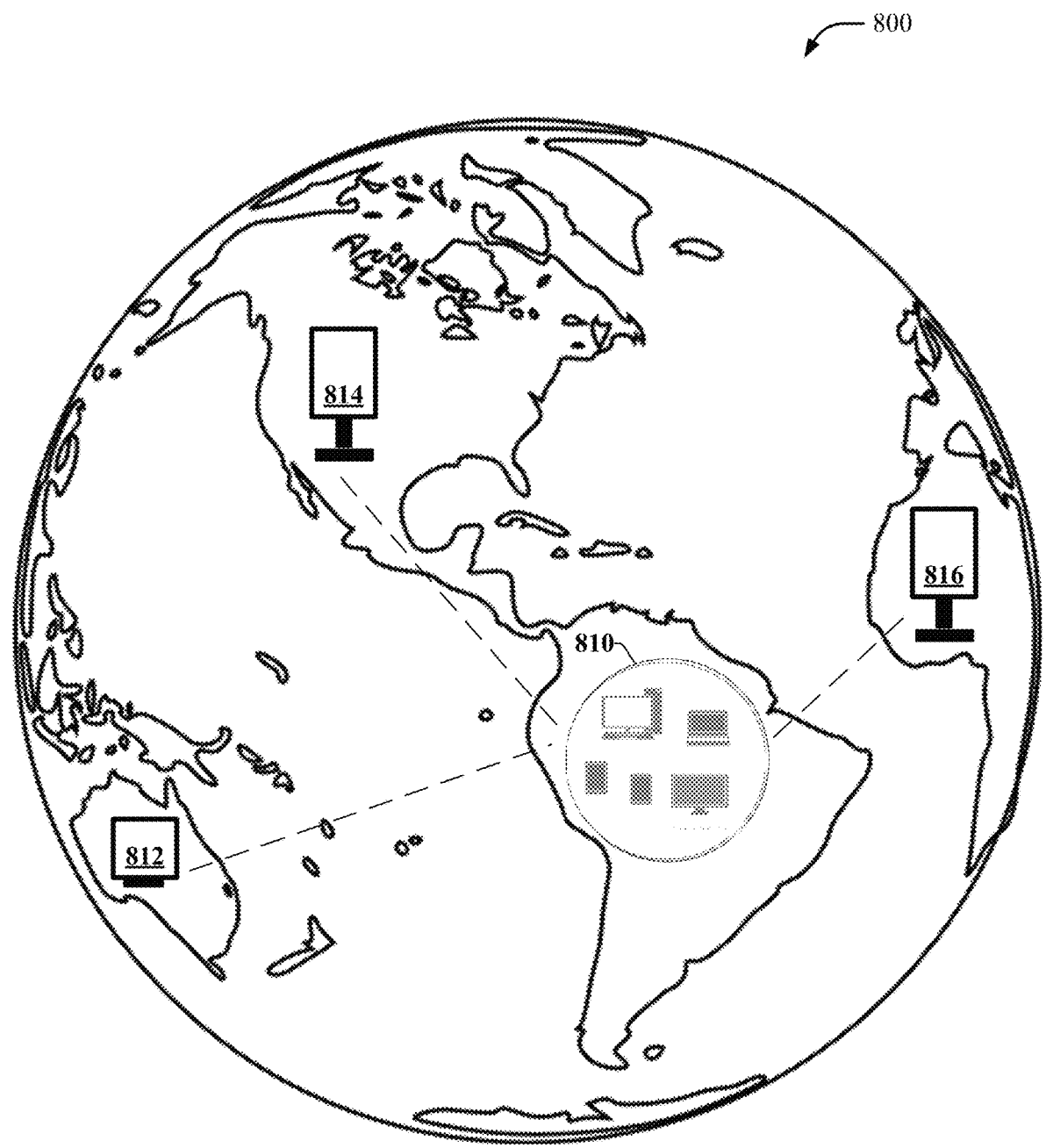
FIG. 8 illustrates a diagram depicting aspects of a content management system in accordance with the present disclosure.

FIG. 8 illustrates a diagram 800 depicting aspects of a user managing the content for multiple digital sign assemblies 812, 814, and 816 remotely using the content management system described herein and a remote device 810. The remote device 810 and each digital sign assembly 812, 814, and 816, are connected to the Internet. The user is not the end-user, but is instead someone who has authority to create the playlists for the digital sign assemblies, such as, a system administrator, owner, coach, manager, or employee of a location where a digital sign assembly is located. Stated alternatively, the user may be someone who is tasked with uploading and organizing content into playlists for the digital sign assembly 812, 814, and 816. Here, a user's remote device 810 may be associated with multiple digital sign assemblies with a session, such as digital sign assemblies 812, 814, 816. This allows the user to control and manage content, playlists, and remote controllers across digital sign assemblies (e.g., display signs) simultaneously. The user's remote devices 810 may be used to access one remote controller (e.g., remote controller, 420, 520, 620, or 720) that could control multiple display signs of the same playlist. It is contemplated that the user's remote device 810 may access more than one remote controller (e.g., more than one remote website) for more than one digital sign assembly at the same time.

Figure 9:
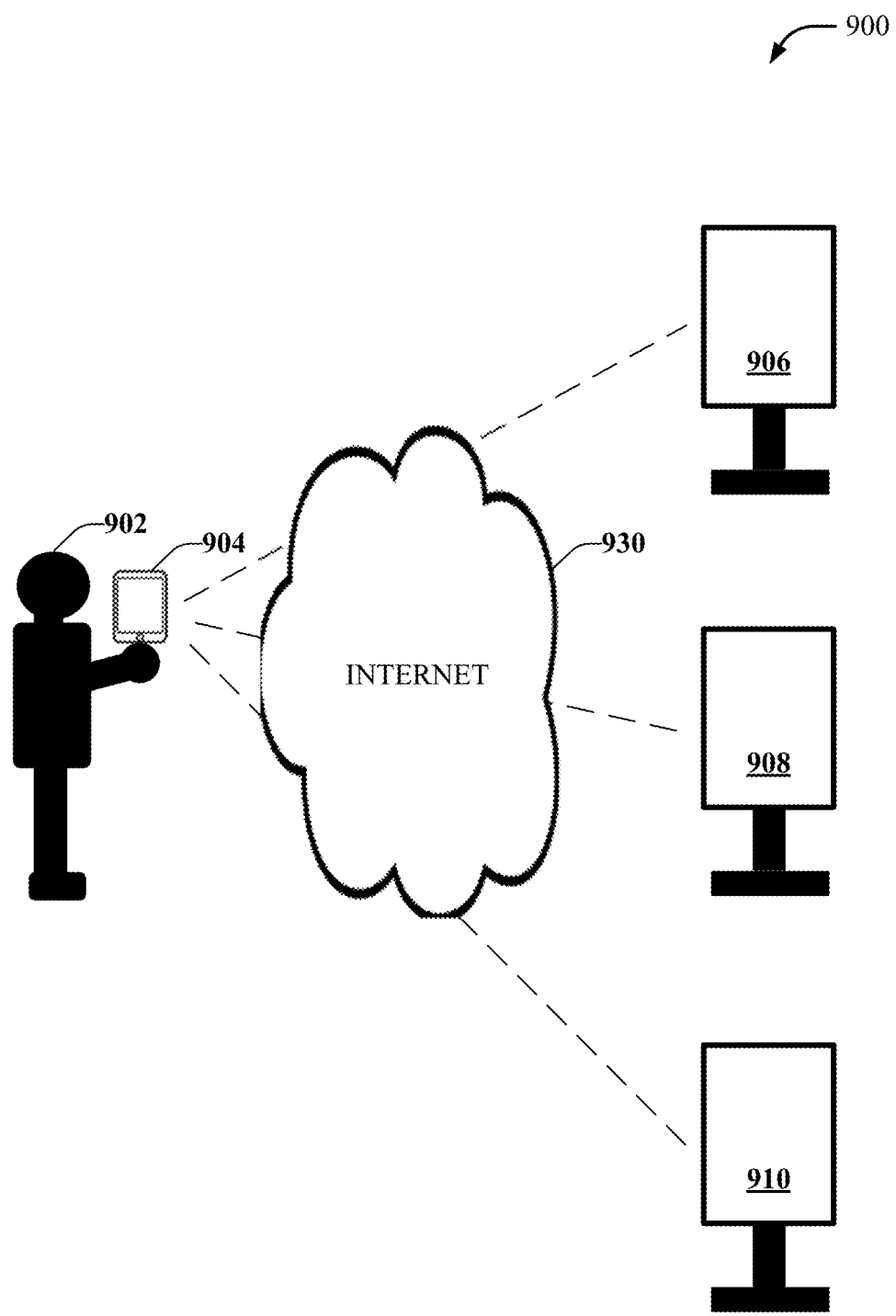
FIG. 9 illustrates a diagram depicting aspects of interactive display signs in accordance with the present disclosure.

FIG. 9 illustrates a diagram 900 depicting aspects of interactive display signs 906, 908, and 910. An end-user 902 may use mobile device 904 to interact with one or more display signs. The mobile device 904 and the digital sign assemblies 906, 908, 910 are each connected to the Internet. An end-user 902 is not required to the connected to the same local network as the digital sign assemblies in order to interact with the digital sign assemblies 906, 908, 910. This is unlike some platforms out there that require the mobile device 904 of the end-user 902 to be connected to the same local network as a digital sign assembly in order for the end-user 902 to interact with the digital sign assembly 906, 908, 910. The end-user 902 may access one or more remote controllers (e.g., remote controllers, 420, 520, 620, or 720) for one or more digital sign assemblies, such as the interactive display signs 906, 908, 910 at the same time. As with using a website, multiple websites may be accessed or opened at the same time. However, when an end-user 902 accesses a remote controller by scanning the QR code displayed on the digital sign assemblies 906, 908, 910, the scanned QR code disappears from the digital sign assemblies 906, 908, 910 for a predetermined amount of time. This ensures that only one end-user can control an interactive display sign at a given time. This avoids the confusion that would be caused by two end-users interacting with the same digital sign assembly 906 concurrently. In an exemplary embodiment, the predetermined length of time elapses when the end-user's session is finished on the remote controller. In another exemplary embodiment, predetermined length of time elapses when closes the browner window containing the remote controller. In another exemplary embodiment, the predetermined length of time elapses after a predetermined length of time passes since the remote controller was first displayed to the end-user on the browser.

FIG. 9 also shows how the end-user 902 may use multiple remote controllers to control the content on multiple digital sign assemblies situated in close proximity to each other. The end user 902 may utilize the remote controllers to display different content on each digital sign assembly. Alternatively, the end-user 902 may choose to display the same content on each digital sign assembly and have the content stitched across all of the digital sign assemblies, such that the individual assemblies act together to display different sections of the content to form one large digital sign assembly displaying the whole of the content (e.g. video wall comprised of multiple digital sign assemblies).

Figure 10A:
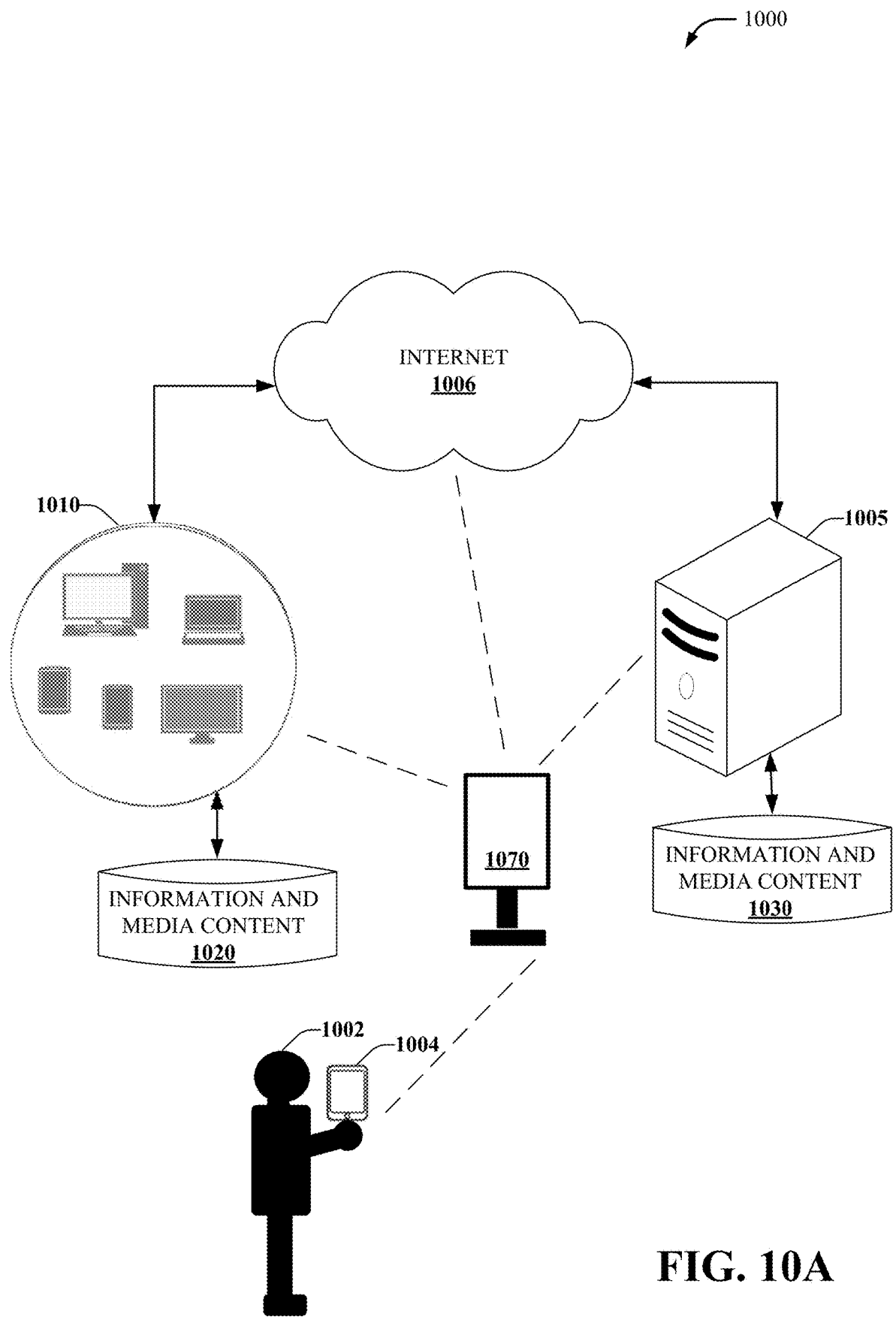
FIGS. 10A-B illustrate a system architecture that may implement the system and method of the present disclosure.
Figure 10B:
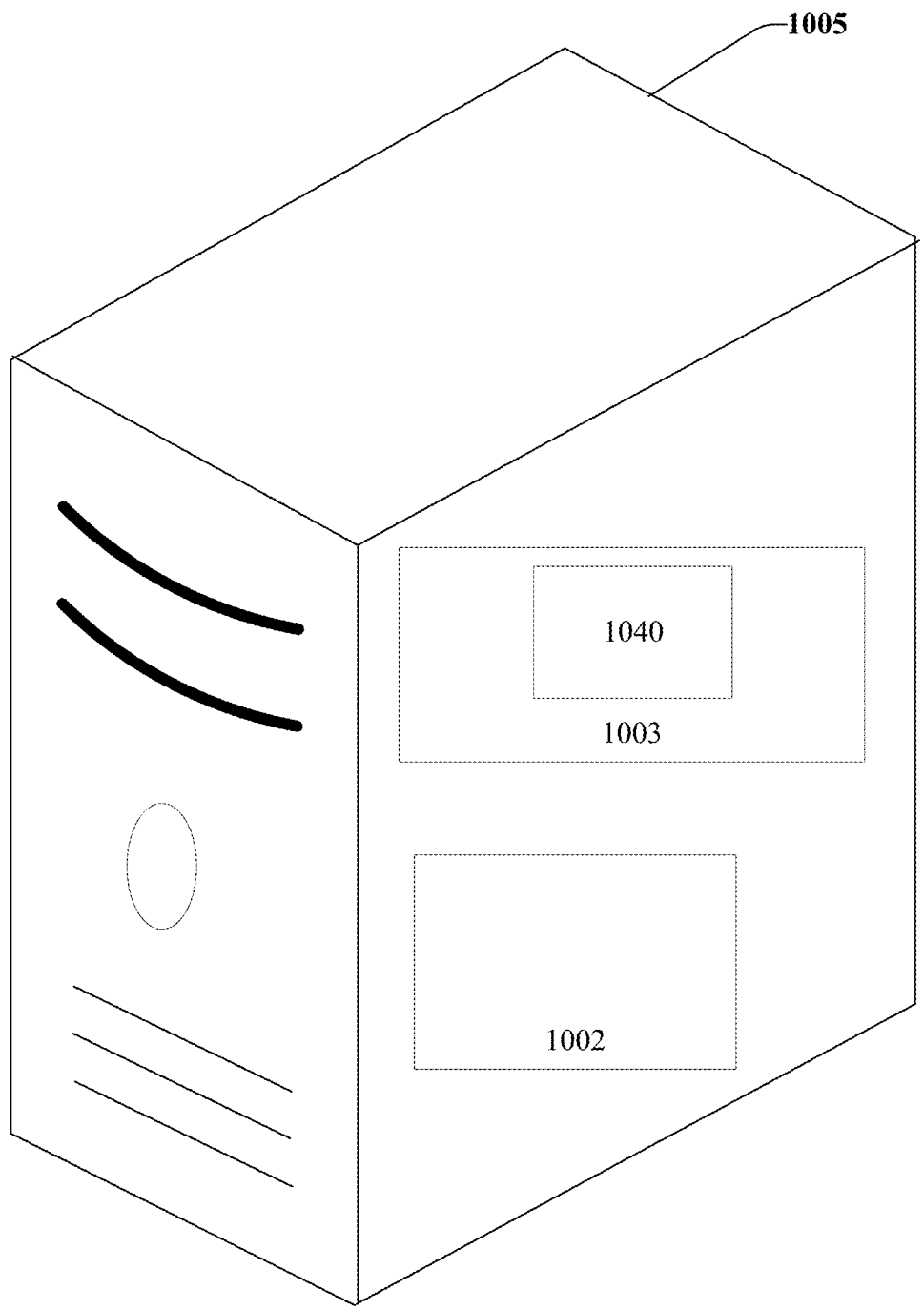

FIGS. 10A-B illustrates a system architecture 1000 that may implement the system and method of the present disclosure. In particular, a user's remote device 1010 may be in communication with digital sign assembly 1070 by way of Internet 1006. In an exemplary embodiment, the user's mobile device 1010 may be in communication with the digital sign assembly 1070 over the Internet 1006 through a CMS 1040 deployed on the digital sign assembly 1070 and/or on a server 1005. The Internet 1006 may be a communication framework that includes the world wide web, cloud, or web/application server such as AWS as is generally known in the art. It is contemplated that the server 1005 may be a traditional physical server connected to the Internet 1006 or server 1005 may be deployed virtually over the internet, such as by an AWS virtual web/application server. The Server 1005 have a memory 1002 and a processor 1003. Media contents are uploaded through the CMS using a web browser, such as through the remote controller UI. The user's remote device 1010 may be used to access the content management software 1040 to control and manage information and media contents 1020, 1030, create playlists, create location-specific playlists, and publish the playlists onto one or more screens 1070. The content management software 1040 facilitates content management by the user associated with the user's device 1010, however, it is contemplated that the user may request that a system administrator (administrator of the CMS and/or digital sign assembly) manage the information and media contents 1020, 1030, create playlists, create location-specific playlists, and publish the playlists the onto one or more screens 1040. Location-specific playlists may be created based on location data entered by the user, or if requested, by the system administrator. The content management software 1040 may also be programmed to read the location data from the one or more screens' or digital sign assembly's global positioning system (GPS) and/or the remote device 1004 of the end-user 1002.

The end-user 1002 may use mobile device 1004 to scan the QR codes on the interactive digital signs shown on the one or more screens 1070 of the digital sign assembly. The QR codes provide a quick access to a website that appears as a remote controller in the browser of the mobile device 1004 of the end user 1002, that has a controller UI used to control (e.g., interact with) the digital sign of the digital sign assembly.

Figure 11:
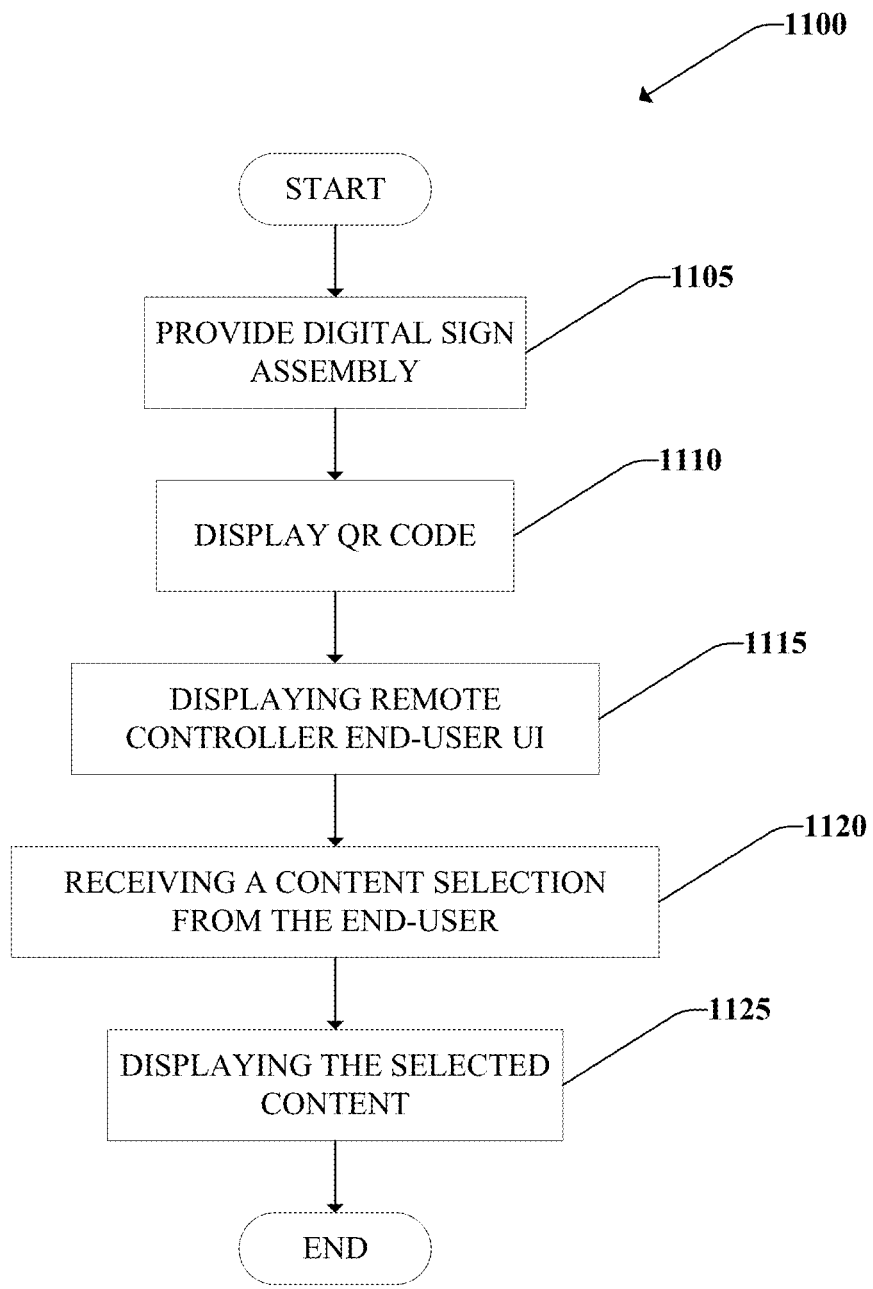
FIG. 11 illustrates a non-limiting example of a method of using the digital sign assembly in accordance with the present disclosure.

FIG. 11 illustrates a non-limiting example of a method of using the digital sign assembly by an end-user in accordance with the present disclosure. This method may be stored in memory 137 of digital sign assembly 135 and executed by processor 136 of digital sign assembly 135. In block 1105, a digital sign assembly 135 is provided. The digital sign assembly may have an internet connected DMP 120 that cooperates with a screen 130 to display a digital sign 450. The digital sign assembly 135 is Internet connectable and controllable by a remote controller on an end-user's mobile device 140. The digital sign assembly may be wirelessly connectable to the Internet.

In block 1110, a QR code is displayed on the screen 130 of the digital sign assembly 135. The QR code is scannable by an Internet connectable mobile device of an end-user of the digital sign assembly 135. The QR code may be generated and provided to the digital sign assembly 135 for display using the CMS, such as the content management software.

In block 1115, a remote controller end-user interface is displayed on the Internet connected mobile device of the end user, when the end-user scans the QR code on the digital sign assembly. The QR code may contain a URL that is opened, via the Internet, by the web browser of the end-user's mobile device. This establishes two-way interactive communication over the Internet between the mobile device of the end user and the digital sign assembly. The mobile device and digital sign assembly do not need to be on the same local network. The two-way communication may be established between the mobile device and the digital sign assembly, as long as the mobile device and the digital sign assembly both have Internet access. When scanned, the QR code opens up the remote controller user interface on the web browser of the end-user mobile device. The remote controller user interface may be coded in HTML. The HTML code of the end-user remote controller user interface may be generated by the CMS, such as the content management software, and delivered to the web browser of the end-user mobile device by the CMS, such as the content management software.

In some exemplary embodiments, when the QR code is scanned by said end-user, the QR code may be temporarily removed from (not displayed on) said digital sign assembly for a predetermined amount of time. The said predetermined amount of time may be equivalent to the length of time the end-user remote controller is displayed on the web browser of the end-user's mobile device, thereby permitting only one mobile device to interact with the digital sign assembly at a time.

The end-user remote controller user interface contains a playlist of the various content that the end-user can display on the screen of the digital display assembly as a digital sign. The playlist shown to the end-user may change (be filtered) based on the location of the digital sign assembly and/or properties of the end-user. The properties of the end-user may include, but are not limited to, class enrollment status. The location may include, but is not limited to, one or more of city, state, region, building, position in room, and/or proximity to specific piece of exercise equipment.

In block 1120, the end-user selects, using the end-user remote controller user interface, the content that the end user wants to display on the screen of the digital display assembly, and the content selection is delivered from the end-user remote controller user interface to the digital display assembly via the Internet. Stated alternatively, the content selection is received from the end-user. The selected content is received by the digital display assembly. In some exemplary embodiments, the content that the end user wants to display is located on the mobile device of the end user, and the content is uploaded from the mobile device of the end-user to the digital display assembly via the end-user remote controller user interface. The content may be delivered from the end-user remote controller user interface to the digital display via the Internet using the CMS, such as the content management software.

In block 1125, the content selected by the end-user in block 1120 using the end-user remote user interface of the end-user remote controller is shown on the screen of the digital sign assembly. The displayed content may be displayed on a single digital sign assembly. In some embodiments, the content may be displayed over multiple digital sign assemblies stitched together to create a video wall of the displayed content.

Figure 12:
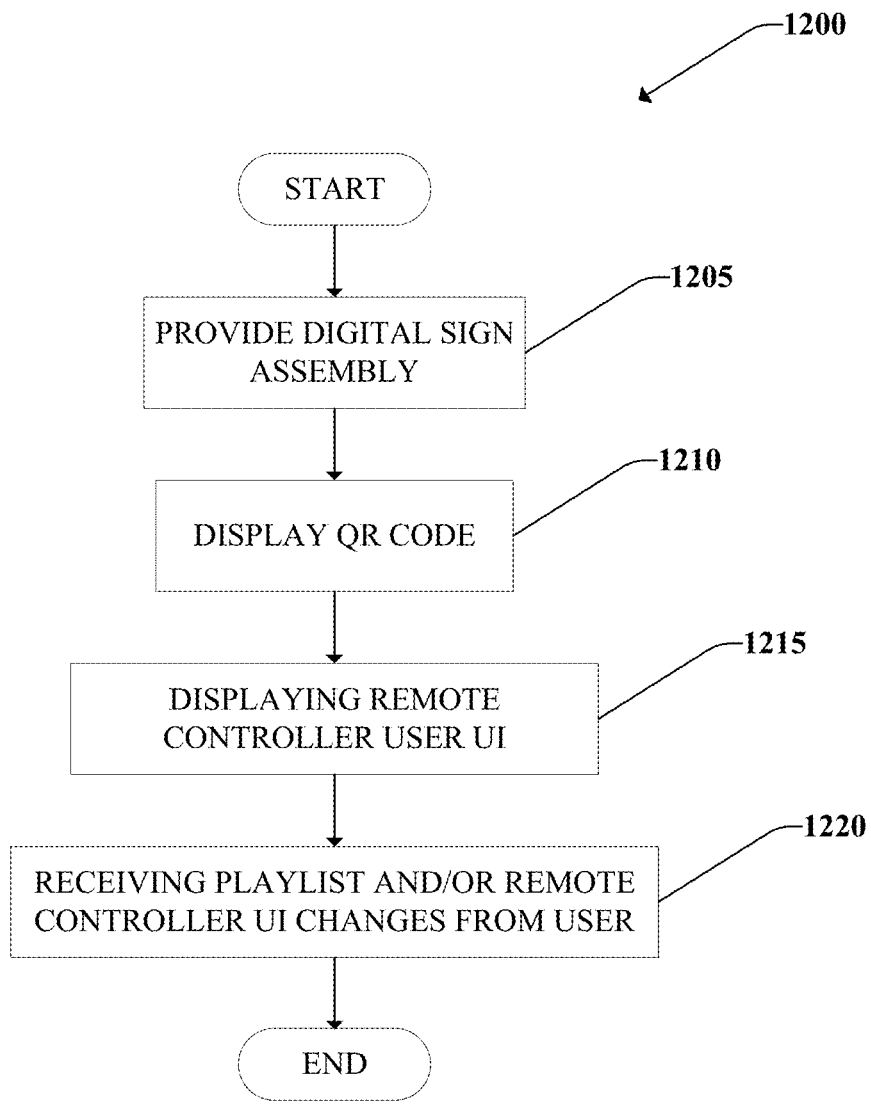
FIG. 12 illustrates an additional non-limiting example of a method of using the digital sign assembly in accordance with the present disclosure.

FIG. 12 illustrates a non-limiting example of a method of using the digital sign assembly by a user in accordance with the present disclosure. The method may be stored in memory 137 of digital sign assembly 135 and executed by processor 136 of the digital sign assembly 135. In block 1205, a digital sign assembly 135 is provided. The digital sign assembly may have an internet connected DMP 120 that cooperates with a screen 130 to display a digital sign 450. The digital sign assembly 135 is Internet connectable and controllable by a remote controller on an user's remote device. The digital sign assembly may be wirelessly connectable to the Internet.

In block 1210, a QR code is displayed on the screen 130 of the digital sign assembly 135. The QR code is scannable by an Internet connectable remote device of a user of the digital sign assembly 135. The QR code may generated and provided to the digital sign assembly 135 for display using the CMS, such as the content management software.

In block 1215, a remote controller user interface is displayed on the remote device of the user, when the user scans the QR code on the digital sign assembly. The QR code may contain a URL that is opened, via the Internet, by the web browser of the user's remote device. This establishes two-way interactive communication over the Internet between the user's remote device and the digital sign assembly. The user's remote device and the digital sign assembly do not need to be on the same local network. The two-way communication may be established between the remote device and the digital sign assembly, as long as the remote device and the digital sign assembly both have Internet access. When scanned, the QR code opwns up the user remote controller user interface on the web browser of the user remote device. The user remote controller user interface may be coded in HTML. The HTML code of the user remote controller user interface may be generated by the CMS, such as the content management software, and delivered to the web browser of the user remote controller by the CMS, such as the content management software.

The user remote controller user interface permits a user to upload content and create playlists of the uploaded content, as described above, for use by an end-user in conjunction with the digital display assembly. The user remote controller user interface also permits the user to design the user interface of the end-user remote controller. The user remote controller user interface also permits the user to design the user interface of the user remote controller.

In 1220, the content, playlist, and/or end-user remote controller interface changes are received from the user from the user remote controller user interface over the Internet, such as through the CMS, such as the content management software, and stored in memory.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing form the scope of the claims hereafter. The terms "includes," "including," and "include" are inclusive and have the same scope as "comprises," "comprising," and "comprise" respectively. The claims, as follows, are intended to include all modifications and alterations insofar as they come within the scope of the claims or the equivalent thereof.

What is claimed is:

1. A method of using a digital sign assembly by an end-user, comprising:
    providing a digital sign assembly, said digital sign assembly having an internet connectable digital media player (DMP) and a screen, wherein said DMP cooperates with said screen to display a digital sign, wherein said digital sign assembly is controllable by a remote controller on an end-user's mobile device;
    displaying a QR code on said screen of said digital sign assembly, said QR code being scannable by said mobile device of said end-user;
    displaying a remote controller end-user interface on said mobile device of said end-user, when said end-user scans said QR code on said digital sign assembly;
    receiving a content selection from said end-user via remote controller end-user interface via said Internet; and
    displaying said content selection using said digital sign assembly as a digital sign;
    wherein content for said content selection is organized in a playlist, said content on said playlist is comprised of: fitness studio information, coach profiles, class schedules, workout equipment station assignments, workout routine information, and member onboarding information;
    wherein said content is customized to said end-user based on said end-user's class enrollment status.

2. The method of claim 1, wherein said content on said playlist is filtered based on said location of said digital sign assembly with respect to a specific piece of exercise equipment in a specific exercise studio in a specific city.

3. The method of claim 1, wherein said remote device of said user is Internet connected; wherein said remote controller user interface is displayed on a browser of said remote device;
    wherein said digital sign assembly is wirelessly connectable to the Internet; wherein said QR code is generated by a content management software, wherein said content selection is content uploaded by said end-user.

4. The method of claim 1, wherein said content on said playlist is further comprised of one or more of, static images, videos, texts, slide show, time schedule, maintenance information, custom graphics uploads, timed corporate announcements, advertisement, augmented reality, structured data, application programming interface, websites, e-commerce, apparel items, and/or sports scores;
  wherein said content on said playlist is organized by media type; wherein said content on said playlist is filtered by user and/or end-user, such that not all content is viewable by all users and end-users.

5. The method of claim 1, when said QR code is scanned by said end-user, the QR code is temporarily removed from said digital sign assembly for a predetermined amount of time, thereby permitting only one mobile device to interact with the digital sign assembly at a time.

6. A method of using a digital sign assembly by a user, comprising:
  providing a digital sign assembly, said digital sign assembly having an internet connectable digital media player (DMP) and a screen, wherein said DMP cooperates with said screen to display a digital sign, wherein said digital sign assembly is controllable by a remote controller on an end-user's remote device;
  displaying a QR code on said screen of said digital sign assembly, said QR code being scannable by said remote device of said user;
  displaying a remote controller user interface on said remote device of said user, when said user scans said QR code on said digital sign assembly; and
  receiving content, playlist, and optionally remote controller user interface changes from said user;
  wherein said content is organized in said playlist, said content on said playlist is comprised of: fitness studio information, coach profiles, class schedules, workout equipment station assignments, workout routine information, and member onboarding information;
  wherein said content is customized to said end-user based on said end-user's class enrollment status.

7. The method of claim 6, wherein said content on said playlist is filtered based on said location of said digital sign assembly with respect to a specific piece of exercise equipment in a specific exercise studio in a specific city.

8. The method of claim 6, wherein said remote device of said user is Internet connected; wherein said remote controller user interface is displayed on a browser of said remote device;
  wherein said digital sign assembly is wirelessly connectable to the Internet; wherein said QR code is generated by a content management software, wherein said content is uploaded by said user, said playlists are created by said user, and said remote controller user interface is created by said user.

9. The method of claim 6, wherein said content on said playlist is further comprised of one or more of, static images, videos, texts, slide show, time schedule, maintenance information, custom graphics uploads, timed corporate announcements, advertisement, augmented reality, structured data, application programming interface, websites, e-commerce, apparel items, and/or sports scores;
  wherein said content on said playlist is organized by media type;
  wherein said content on said playlist is filtered by user and/or end-user, such that not all content is viewable by all users and end-users.

10. The method of claim 6, when the QR code is scanned by said user, said QR code is temporarily removed from said digital sign assembly for a predetermined amount of time, thereby permitting only one mobile device to interact with the digital sign assembly at a time.

11. A digital sign assembly, comprising:
  an internet connectable digital media player (DMP) and a screen, wherein said DMP cooperates with said screen to display a digital sign, wherein said digital sign assembly is controllable by a remote controller on an end-user's mobile device;
  said digital sign assembly further comprising memory and a processor, said memory storing executable code when executed by the processor performs actions comprising:
    displaying a QR code on said screen of said digital sign assembly, said QR code being scannable by said mobile device of said end-user;
    displaying a remote controller end-user interface on said mobile device of said end-user, when said end-user scans said QR code on said digital sign assembly;
    receiving a content selection from said end-user via remote controller end-user interface via said Internet; and
    displaying said content selection using said digital sign assembly as a digital sign;
  wherein content for said content selection is organized in a playlist, said content on said playlist is comprised of: fitness studio information, coach profiles, class schedules, workout equipment station assignments, workout routine information, and member onboarding information;
  wherein said content is customized to said end-user based on said end-user's class enrollment status.

12. The digital sign assembly of claim 11, wherein said content on said playlist is filtered based on said location of said digital sign assembly with respect to a specific piece of exercise equipment in a specific exercise studio in a specific city.

13. The digital sign assembly of claim 11, wherein said remote device of said user is Internet connected; wherein said remote controller user interface is displayed on a browser of said remote device;
  wherein said digital sign assembly is wirelessly connectable to the Internet; wherein said QR code is generated by a content management software, wherein said content selection is content uploaded by said end-user.

14. The digital sign assembly of claim 11, wherein said content on said playlist is further comprised of one or more of, static images, videos, texts, slide show, time schedule, maintenance information, custom graphics uploads, timed corporate announcements, advertisement, augmented reality, structured data, application programming interface, websites, e-commerce, apparel items, and/or sports scores;
  wherein said content on said playlist is organized by media type; wherein said content on said playlist is filtered by user and/or end-user, such that not all content is viewable by all users and end-users.

15. The digital sign assembly of claim 11, when said QR code is scanned by said end-user, the QR code is temporarily removed from said digital sign assembly for a predetermined amount of time, thereby permitting only one mobile device to interact with the digital sign assembly at a time.

16. A digital sign assembly, comprising:
  an internet connectable digital media player (DMP) and a screen, wherein said DMP cooperates with said screen to display a digital sign, wherein said digital sign assembly is controllable by a remote controller on a user's remote device;

said digital sign assembly further comprising memory and a processor, said memory storing executable code when executed by the processor performs actions comprising:
- displaying a QR code on said screen of said digital sign assembly, said QR code being scannable by said remote device of said user;
- displaying a remote controller user interface on said remote device of said user, when said user scans said QR code on said digital sign assembly; and
- receiving content, playlist, and remote controller user interface changes from said user;
- wherein said content is organized in said playlist, said content on said playlist is comprised of: fitness studio information, coach profiles, class schedules, workout equipment station assignments, workout routine information, and member onboarding information;
- wherein said content is customized to said end-user based on said end-user's class enrollment status.

17. The digital sign assembly of claim 16, wherein said content on said playlist is filtered based on said location of said digital sign assembly with respect to a specific piece of exercise equipment in a specific exercise studio in a specific city.

18. The digital sign assembly of claim 16, wherein said remote device of said user is Internet connected; wherein said remote controller user interface is displayed on a browser of said remote device;
- wherein said digital sign assembly is wirelessly connectable to the Internet; wherein said QR code is generated by a content management software, wherein said content is uploaded by said user, said playlists are created by said user, and said remote controller user interface is created by said user.

19. The digital sign assembly of claim 16,
- wherein said content on said playlist is further comprised of one or more of, static images, videos, texts, slide show, time schedule, maintenance information, custom graphics uploads, timed corporate announcements, advertisement, augmented reality, structured data, application programming interface, websites, e-commerce, apparel items, and/or sports scores;
- wherein said content on said playlist is organized by media type;
- wherein said content on said playlist is filtered by user and/or end-user, such that not all content is viewable by all users and end-users.

20. The digital sign assembly of claim 16, when the QR code is scanned by said user, said QR code is temporarily removed from said digital sign assembly for a predetermined amount of time, thereby permitting only one mobile device to interact with the digital sign assembly at a time.

* * * * *